United States Patent
Brekke et al.

(10) Patent No.: US 8,537,027 B2
(45) Date of Patent: Sep. 17, 2013

(54) METHOD FOR CONTROLLING AN ELECTRONIC DEVICE AND ELECTRONIC DEVICE

(75) Inventors: Endre Brekke, Trondheim (NO); Vegard Horten, Rasta (NO); Vidar Steigen, Nittedal (NO)

(73) Assignee: Siemens Aktiengesellschaft, Munich (DE)

(*) Notice: Subject to any disclaimer, the term of this patent is extended or adjusted under 35 U.S.C. 154(b) by 958 days.

(21) Appl. No.: 12/374,886

(22) PCT Filed: Jul. 24, 2006

(86) PCT No.: PCT/EP2006/007271
§ 371 (c)(1),
(2), (4) Date: Jan. 29, 2009

(87) PCT Pub. No.: WO2008/011892
PCT Pub. Date: Jan. 31, 2008

(65) Prior Publication Data
US 2009/0207003 A1    Aug. 20, 2009

(51) Int. Cl.
G01V 3/00 (2006.01)
G08C 19/16 (2006.01)
G08B 21/00 (2006.01)
H04B 13/02 (2006.01)
H04B 1/38 (2006.01)
H04B 3/00 (2006.01)
H04M 3/00 (2006.01)
H04M 11/00 (2006.01)
H04M 11/04 (2006.01)
H04W 4/00 (2009.01)
E21B 47/00 (2012.01)

(52) U.S. Cl.
USPC ............ 340/853.1; 340/12.32; 340/618; 340/850; 375/222; 375/257; 455/419; 455/422.1; 166/250.13; 379/93.01; 379/39

(58) Field of Classification Search
USPC ............ 340/310.11, 5.1, 966, 980, 961, 988, 340/995, 945, 967, 971, 973, 974, 975, 976, 340/977, 978, 979, 407.1, 407.2; 455/418, 455/419, 420, 463, 68, 69, 556, 557; 370/314, 370/442, 310, 310.2, 324, 328, 389, 395.52, 370/428, 521; 714/2, 3, 12, 13, 38, 22, 43, 714/47, 55, 814, 815
See application file for complete search history.

(56) References Cited

U.S. PATENT DOCUMENTS 4,845,486 A * 7/1989 Knight et al. ............... 340/618
5,134,644 A * 7/1992 Garton et al. ................ 379/39

(Continued)

FOREIGN PATENT DOCUMENTS

RU    2265240 C2    5/2005

OTHER PUBLICATIONS

International Search Report; PCT/EP2006/007271; pp. 2, May 25, 2007.

*Primary Examiner* — Jennifer Mehmood
*Assistant Examiner* — Mirza Alam
(74) *Attorney, Agent, or Firm* — King & Spalding L.L.P.

(57) ABSTRACT

In a method for controlling an electronic device (1) with a programmable component and an independent microcontroller (10) and in such an electronic device (1), by the microcontroller (10), the component is monitored, a malfunction of the component is identified and the component is reprogrammed.

23 Claims, 4 Drawing Sheets

(56) References Cited

U.S. PATENT DOCUMENTS

| | | | |
|---|---|---|---|
| 5,541,840 A | 7/1996 | Gurne et al. | 364/424.03 |
| 5,805,882 A * | 9/1998 | Cooper et al. | 713/2 |
| 5,930,704 A * | 7/1999 | Kay | 455/419 |
| 6,745,325 B1 | 6/2004 | Gavlik | 3/100 |
| 2002/0045952 A1 * | 4/2002 | Blemel | 700/2 |
| 2002/0194521 A1 | 12/2002 | Ma et al. | 714/1 |
| 2003/0021736 A1 | 1/2003 | Kang et al. | 422/102 |
| 2003/0126253 A1 * | 7/2003 | Ewing et al. | 709/223 |
| 2003/0148793 A1 | 8/2003 | Sundararajan et al. | 455/561 |
| 2003/0217306 A1 | 11/2003 | Harthcock et al. | 714/30 |
| 2004/0159430 A1 * | 8/2004 | Baggs | 166/250.15 |
| 2005/0096034 A1 * | 5/2005 | Petermann | 455/422.1 |
| 2005/0243983 A1 * | 11/2005 | Causier | 379/93.01 |
| 2006/0100718 A1 * | 5/2006 | Huffington | 700/19 |

* cited by examiner

METHOD FOR CONTROLLING AN ELECTRONIC DEVICE AND ELECTRONIC DEVICE

CROSS-REFERENCE TO RELATED APPLICATIONS

This application is a U.S. National Stage Application of International Application No. PCT/EP2006/007271 filed Jul. 24, 2006, which designates the United States of America. The contents of which are hereby incorporated by reference in their entirety.

TECHNICAL FIELD

The invention relates to a method for controlling an electronic device comprising a programmable component and to such an electronic device, in particular to a modem for subsea power line communication.

BACKGROUND

Subsea power line communication is a special form of underwater communication. It is preferably used in exploring and exploiting gas and oil fields located at the seabed. Subsea communication is used, for example, for transmitting binary data between topside control sites and subsea wellheads. Gas and oil fields that are explored or exploited using electronic communication to the wellheads or to other electronic equipment are sometimes called "electronic fields" (e-fields).

In prior art, different techniques for subsea communication have been described. On the one hand, there are wired electric or optical connections, on the other hand there are wireless connections. The wired connections can be subdivided into a first group providing communication lines for electronic or optical connections separate from electric power and a second group utilising power lines for electronic communications. In the latter case, advantageously no separate communication lines are needed.

For example, in US 2005/0243983 A1, a modem for receiving and data from and to a conductor is described. It comprises an output drive for transmitting data to the conductor and impedance matching means for matching an impedance of a receiver input with an impedance of the conductor. A gain of the output drive, a receiver gain and the impedance of the receiver input are adjustable at this modem.

A programmable component (and thus the electronic device in which it is integrated) can reach an irregular state from which it cannot escape on its own. This can occur, for example, because of a programming error, because of certain environmental conditions such as heat, because of internal or external electronic interference, because of ageing of the component, because of electromigration, or because of a combination of these reasons. Besides, a programmable component can fail, because its software has been damaged, e.g. due to a flipped bit or a damaged cell in the command memory of the component. Any state in which an electronic component does not behave like it is supposed to is called a malfunction in the following.

If a programmable component, in particular of a subsea power line modem, is subject to a malfunction, it often suffices to restart the component or the whole device to reset the device into a fully operational state. This is usually performed using a so-called watchdog for monitoring the component. If the component does not fulfil a certain condition that is monitored by the watchdog, a restart is triggered by the watchdog. However, the circumstances that caused the malfunction persist and the irregular state may occur again sooner or later. Hence, the software of the programmable device should be updated as soon as possible.

For this purpose, known modems for subsea power line communication and other electronic devices provide a direct connection via an external port to reprogram the appropriate component. It is obvious that this is not possible under all circumstances. For example, if a subsea modem is already deployed on the seabed retrieving it for reprogramming means an enormous downtime for the subsea equipment, which is also expensive, because the oil/gas exploration/exploitation is out of service then, too.

Even if only a desktop electronic device is concerned, connecting the device to a programming unit takes much time, resulting in a significant downtime for the device.

SUMMARY

According to various embodiments, a method for controlling an electronic device by which a downtime in case of a malfunction of a programmable component can be kept short or even completely avoided, and a corresponding electronic device can be specified.

According to an embodiment, a method for controlling an electronic device comprising a programmable component and an independent microcontroller, may comprise the following steps which can be performed by the microcontroller: —monitoring the component; —identifying a malfunction of the component; and—reprogramming the component.

According to a further embodiment, the component or the electronic device can be restarted by the microcontroller after reprogramming the component. According to a further embodiment, the electronic device may comprise at least one other programmable component that is monitored by the microcontroller. According to a further embodiment, the component can be a digital signal processor executing multiple software-subsystems, and wherein checksum values output by several of these software-subsystems may be summed up to a total checksum for the monitoring. According to a further embodiment, the total checksum may be compared to a predefinable reference value for the monitoring. According to a further embodiment, a watchdog message may be sent to the microcontroller only if the total checksum and the reference value match. According to a further embodiment, the malfunction may be identified if no watchdog message is received at the microcontroller for a predefinable period of time. According to a further embodiment, an instruction set for the reprogramming may be selected by the microcontroller from multiple instruction sets stored in the electronic device. According to a further embodiment, the multiple instruction sets may differ in their level of fail-safety. According to a further embodiment, an instruction set may be selected that is stable in any foreseeable situation of the electronic device.

According to another embodiment, an electronic device may comprise a programmable component and an independent microcontroller dedicated for monitoring the component, wherein the microcontroller is able to identify a malfunction of the component whereupon the microcontroller reprograms the component.

According to a further embodiment, the microcontroller may restart the component or the electronic device after reprogramming the component. According to a further embodiment, the electronic device may comprise at least one other programmable component that the microcontroller is able to monitor. According to a further embodiment, the component may be a digital signal processor executing multiple software-subsystems, the digital signal processor being able to sum up checksum values output by several of its software-subsystems to a total checksum. According to a further embodiment, the digital signal processor may compare the total checksum to a predefinable reference value. According to a further embodiment, the digital signal processor may send a watchdog message to the microcontroller only if the total checksum and the reference value match. According to a further embodiment, the microcontroller may identify the malfunction if it receives no watchdog message for a predefinable period of time. According to a further embodiment, the microcontroller may detect a type of the malfunction and, depending on this type, selects an instruction set for the reprogramming from multiple instruction sets stored in the electronic device. According to a further embodiment, the multiple instruction sets may differ in their level of fail-safety. According to a further embodiment, the instruction sets may be stored in an independent flash memory. According to a further embodiment, the electronic device may comprise an external port for a permanent data connection. According to a further embodiment, the electronic device may be a modem for subsea power line communication.

BRIEF DESCRIPTION OF THE DRAWINGS

In the following, the invention is described in further detail with several drawings.

In all drawings, corresponding parts are denoted by identical reference signs.

DETAILED DESCRIPTION

Figure 1:
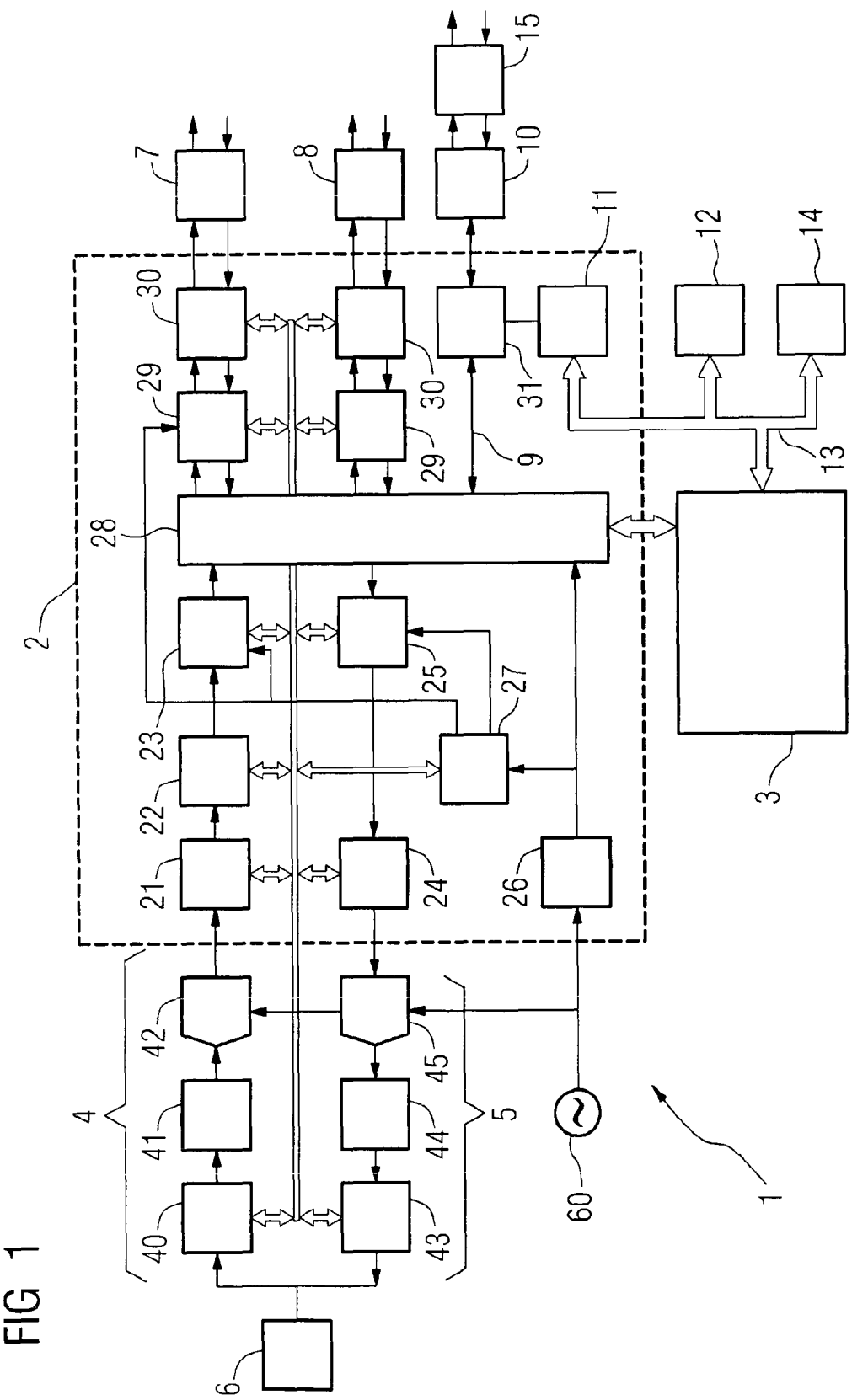
FIG. 1 shows a block diagram of a subsea power line modem.

According to various embodiments, it is proposed to use an electronic device comprising a programmable component and an independent microcontroller, wherein the microcontroller monitors said component, identifies a malfunction of said component, and reprograms said component.

By this solution, the electronic device can be kept operational without the need for external access, in particular for physical access. Hence, the downtime in case of a malfunction can be kept short. Therefore, the solution according to various embodiments is also cost-efficient. These advantages are achieved by the possibility to automatically reprogram the malfunctioning component by the microcontroller. The software used for reprogramming can be either just be the same version as before, but loaded from a backup memory, or it can be a more fail-safe version from a backup memory, or it can be a software update to a new version. The backup memory is preferably located within the electronic device for fast access. A new software update can alternatively be obtained via a permanent external data connection, for example via a power line data connection in case of the device being a modem for subsea power line communication.

Advantageously, said component or said electronic device is restarted by said microcontroller after reprogramming said component. This is the fastest and most secure way to reset the electronic device into a defined operational state after reprogramming.

Preferably, said electronic device comprises at least one other programmable component that is monitored by said microcontroller, for example a field programmable gate array (FPGA). This enables to take precaution against malfunctions of several components using only one common microcontroller. In this case, the microcontroller can decide in situ, which component to reprogram and restart and which one to restart only, for example.

In a sophisticated embodiment, said component is a digital signal processor (DSP) executing multiple software-subsystems, and checksum values output by several of these software-subsystems are summed up to a total checksum for said monitoring, in particular by said digital signal processor. This procedure is a simple and fast way to detect a malfunction in a manifold of software-subsystems of a digital signal processor.

It is preferably used in an embodiment where said total checksum is compared to a predefinable reference value for said monitoring, in particular by said digital signal processor. In this embodiment, only a flag describing the state of the digital signal processor has to be transferred to the monitoring microcontroller, thus reducing the necessary bandwidth.

In a further sophisticated embodiment, a watchdog message is sent to said microcontroller, in particular from said further sophisticated, only if said total checksum and said reference value match. Thus, even in case of a complete software-caused breakdown of the further sophisticated the microcontroller will be informed because of a missing watchdog message, and can reprogram the digital signal processor.

A simple identification of a malfunction is thus possible if no watchdog message is received at the microcontroller for a predefinable period of time.

Advantageously, an instruction set, i.e. a software version, for said reprogramming is selected by the microcontroller from multiple instruction sets stored in said electronic device. Multiple instruction sets allow preserving software either for different components, or redundantly as multiple copies of the same software version for one component.

In a highly preferred embodiment, said multiple instruction sets differ in their level of fail-safety, i.e., they do not all represent the same software version. This allows for selecting an appropriate level of fail-safety depending on the situation. A more fail-safe version will drive the electronic device at a lower performance, but will presumably avoid the malfunction. For example, each time a malfunction is identified within a certain predefinable time window, the next even more fail-safe version can be used for reprogramming, thus reducing the probability for another malfunction stepwise. However, performance is thus reduced stepwise, too, but operation of the electronic device is indeed maintained this way.

Preferably, one of the multiple instruction sets is designed to be stable in any foreseeable situation of the electronic device.

wherein an instruction set is selected that is stable in any foreseeable situation of the electronic device For selecting the instruction set, a type of said malfunction can be detected, in particular by said microcontroller. This allows for selecting an appropriate level of fail-safety depending on the detected type of malfunction. For example, if it is likely that a specific malfunction in a software-subsystem has been caused by temporary electronic interferences that can be foreseen to last for some hours only, an instruction set in which the specific subsystem is unused can be chosen for reprogramming. Hence, the current interference does not have an impact onto the device. A timer can be set after reprogramming to automatically reprogram with the full performance instruction set after the interference is estimated to be over.

Fast access to the instruction sets is provided if they are stored in an independent flash memory. Besides, this enables external updates of the instruction sets via an external data connection.

An advantage obtained by the various embodiments may be in particular, that possible downtimes of an electronic device can be reduced or even eliminated.

FIG. 1 shows a block diagram of a topside modem for communication via a subsea power line (not shown) to an e-field (not shown) as an example for an electronic device 1. The power line is also called the umbilical. The electronic device 1 comprises a field programmable gate array 2, a digital signal processor 3, an analogue-to-digital processing line 4 and a digital-to-analogue processing line 5, clocked by a 2 MHz oscillator 60. Both processing lines 4 and 5 are connected with a diplexer 6 via a differential interface (not shown). The modem uses orthogonal frequency division multiplexing (OFDM) for modulating and demodulating binary payload data to and from the electric signal of the power line.

The analogue-to-digital processing line 4 comprises a low-noise amplifier 40, an anti-aliasing filter 41 and an analogue-to-digital converter 42. The digital-to-analogue processing line 5 comprises a power amplifier 50, a low-pass filter 51 and a digital-to-analogue converter 52. The processing lines 4, 5 are continued in the field programmable gate array 2 by a high-pass filter 21, a receive filter and decimator 22 and a receive first-in-first-out buffer 23 (=FIFO), as well as a send filter and interpolator 24 and a send first-in-first-out buffer 25. The field programmable gate array 2 furthermore comprises a clock phase locked look 26, an orthogonal frequency division multiplexing timing unit 27, a digital signal processor interface and gate array programming registers 28, two in and out first-in-first-out buffers 29, two universal asynchronous receiver transmitters 30 (UART), and serial peripheral interface slave 31.

By the diplexer 6, the electronic device 1 is connectable to the subsea power line. The field programmable gate array 2 provides two independent bidirectional external serial interfaces, one RS-485 connection 7 connectable with a so-called PROFIBUS for binary payload data, and one RS-232 connection 8 for diagnostic data. The components are mounted on both sides of a single six-layer printed circuit board (PCB; not shown in this figure). The field programmable gate array 2 provides a serial peripheral interface (SPI) 9 to which an independent microcontroller 10 is connected. The microcontroller 10 is a system-on-chip (SoC), i.e., a CPU, a random access memory (RAM), a flash memory and a 4 kByte electrically erasable programmable read-only memory (EEPROM) reside on a single chip (not shown). For example, the microcontroller 10 may be taken from the Atmel AVR series. These are highly reliable processors. If the software is thoroughly developed, an AVR series microcontroller 10 is as reliable as most hardware components and much more reliable than normal microprocessors depending on external buses and multiple devices. The electrically erasable programmable read-only memory serves for storing persistent parameters and for error logging. The error log is character based, i.e., the log is filled with characters until no space is left.

The microcontroller 10 has access to a flash programmer 11 via the serial peripheral interface 9. The flash programmer 11 is connected to the digital signal processor 3 and an external flash memory 12 via another bus 13. A digital signal processor random access memory 14 is connected to this bus 13, too, serving the digital signal processor 3 as a command memory. Besides, the microcontroller 10 is connected with sensors (not shown) for measuring temperature levels in the electronic device 1 and for measuring power levels used for the orthogonal frequency division multiplexing. Additionally, it has an RS-232 external serial connection 15 for terminal emulation. It contains an internal on-chip watchdog with its own internal clock oscillator. It also contains an internal brownout detector that monitors its operational voltage. A voltage glitch below 2.7 V will cause a full reset of the microcontroller 10.

The orthogonal frequency division multiplexing is essentially performed by the field programmable gate array 2. On the one hand, it creates an orthogonal frequency division multiplexing modulated signal from the binary data obtained from the RS-485 connection 7 and, if required, from diagnostic data obtained from the RS-232 connection 8. These data are modulated onto the electric signal of the power line. On the other hand, the field programmable gate array 2 demodulates an orthogonal frequency division multiplexing signal obtained from the power line via the diplexer 6 into binary payload data, and, if necessary, into diagnostic data that are output to the RS-485 connection 7 and the RS-232 connection 8, respectively. As computation costs are high for orthogonal frequency division multiplexing the field programmable gate array 2 utilizes the digital signal processor 3 for both modulation and demodulation. Appropriate digital signal processors 3 are commercially available.

With orthogonal frequency division multiplexing, which itself is known from television broadcasting, the transmitting modem sends on multiple different orthogonal frequencies called carrier bands or channels. Two carrier bands are said to be orthogonal if they are independent from each other regarding their relative phase relationship. The binary data is modulated onto the electric signal in the form of so-called orthogonal frequency division multiplexing symbols.

Using orthogonal frequency division multiplexing for subsea power line communication results in several advantages. The different carrier bands can be close to each other in terms of frequency, thus enabling high spectrum efficiency, allowing for a high total bit rate. Besides, orthogonal frequency division multiplexing allows for easily filtering out noise. If a certain frequency range encounters interference, the respective carrier bands can be operated a slower bit rate or can even be disabled. This way, a high operational range, i.e. the maximum length of the power line, up to 200 km can be achieved. Additionally, by assigning appropriate numbers of carrier bands to upstream and downstream transmission, the respective bit rates can be adjusted as required.

The field programmable gate array 2 and the digital signal processor 3 are programmable components of the electronic device 1. It is essential for the operation of the electronic device 1 that they are working properly. However, a malfunction may happen as described above, resulting in an irregular state of the affected component. Such a malfunction may even have an impact on other components leading them to malfunction, too. The field programmable gate array 2 and the digital signal processor 3 are not able to restore themselves to regular operation if a malfunction occurs. To prevent downtimes of the electronic device 1 because of component malfunctions, the microcontroller 10 permanently monitors the field programmable gate array 2 and the digital signal processor 3 for regular operation.

Figure 2:
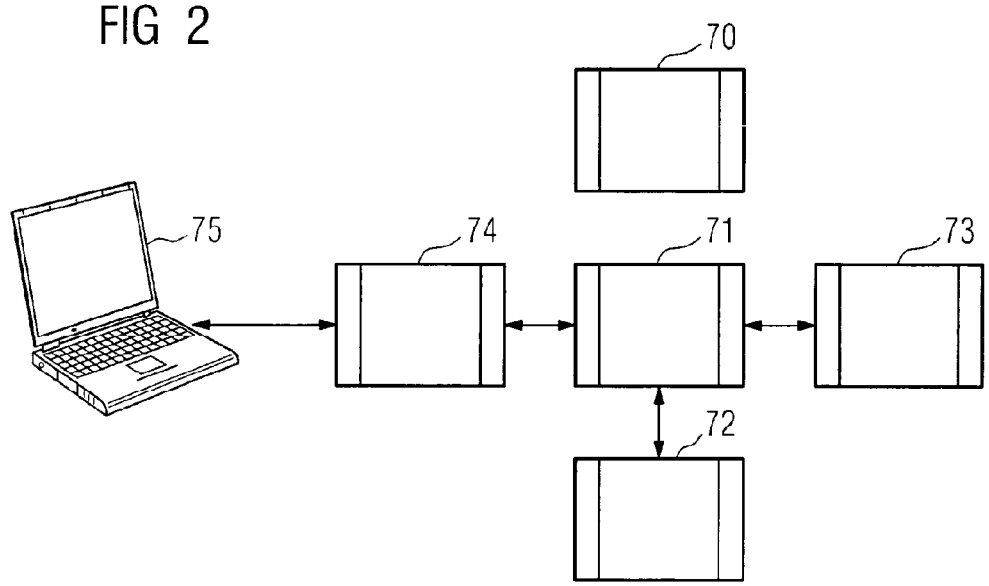
FIG. 2 schematically shows the digital signal processor monitoring.

The software instructions for the microcontroller 10 are stored in its internal flash memory, comprising several modules. The most important are depicted in FIG. 2. Alongside the main module 70, one message router module 71 provides message routing functions as the microcontroller 10 code is message-driven. A command processing module 72 provides command processing capabilities. A timer module 73 provides a timer routine for monitoring. And a universal asynchronous receiver transmitter module 74 provides a serial interface access at the external serial connection 15 to an external terminal 75. The internal messages of the microcontroller 10 are of fixed size allowing for up to three characters, and the pool of free messages is created early in the initialisation portion of the main module 70. If the message pool should become empty the code will call a panic function with a string as parameter. The panic function writes the string into the electrically erasable programmable read-only memory based log and switches off the interrupt system. Then, it waits in an empty endless loop for the watchdog to fire.

The microcontroller 10 cannot execute code in random access memory, hence, a sequence of code exist in program space that resets the internal watchdog. This sequence of code is guarded by a simple condition. It will not be executed unless an array of three integers has the sum of 49. If and only if the sum is 49 the internal watchdog is reset and the array is cleared for a new contribution cycle. There are three contributors to the three integers. The timer interrupt code installs its contribution as it is entered by the timer interrupt hardware once every 10 ms. The message router module 71 installs its contribution just before it checks if any messages are pending. And the universal asynchronous receiver transmitter module 74 installs its contribution when its thread function gets called. If the time between the internal watchdog resets gets longer than 0.27 seconds, the watchdog fires and the microcontroller 10 will be forced to start executing from its power on vector. Early in the initialisation sequence, the microcontroller 10 reprograms the field programmable gate array 2 and the digital signal processor 3 from their respective flash memories 12 and restarts them.

In the external flash memory 12, four different software versions for the digital signal processor 3 are stored in four different memory pages. Additionally, the software for the field programmable gate array 2 is stored in a separate memory page as a single backup version. In the fourth page of the flash memory 12, there is stored the digital signal processor 3 software version that has proven to have the best performance. In the first page, there is stored the version that is most fail-safe, i.e. which is stable in all foreseeable situations of the electronic device 1. The versions stored in the second and third memory page do not utilize the most sensitive features of the digital signal processor 3, thereby waiving the full potential performance of the modem regarding the transmission bit rate. The digital signal processor 3 software versions stored in the first to the third memory page of the flash memory 12 can thus be said to be less challenging than the version stored in the fourth memory page. However, the operational range of the modem is not restricted by the less challenging software versions to ensure the availability of the subsea power line connection under all circumstances.

Figure 3:
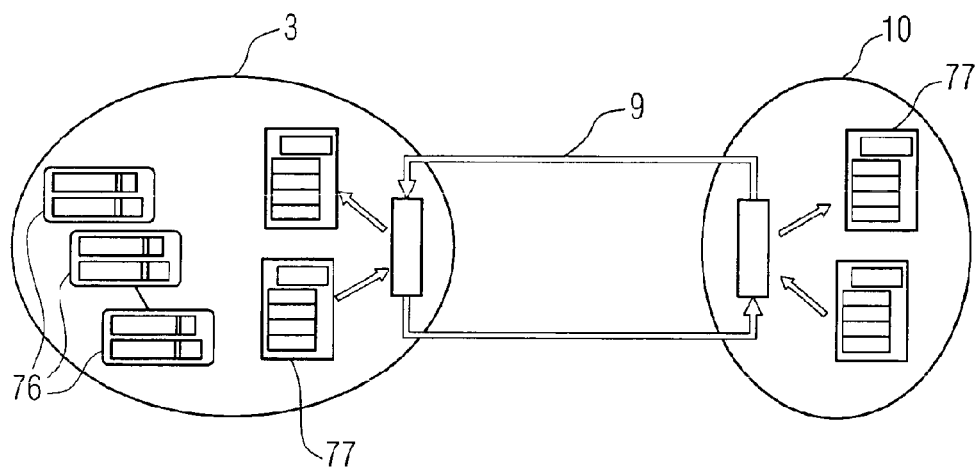
FIG. 3 shows a block diagram of the main software modules of the digital signal processor.

FIG. 3 schematically shows the digital signal processor 3 monitoring procedure. The digital signal processor 3 software performs an internal check whether its different subsystems 76 operate correctly. For this purpose, each subsystem i writes a specific number g_liveproof(i) into a specific entry of a global table whenever respective subsystem code is executed normally. The digital signal processor 3 sums up all table entries to a total checksum. Only if the total checksum equals a specific predefined reference value $A$:

$$\sum_i g\_liveproof(i) = A,$$

which means that all monitored digital signal processor 3 software-subsystems work correctly, a 32-bit watchdog message 77 is sent to the microcontroller 10 via the serial peripheral interface 9. By default, a watchdog message is sent every 10 seconds, which may be overridden through a parameter "WatchdogTimeout".

Figure 4:
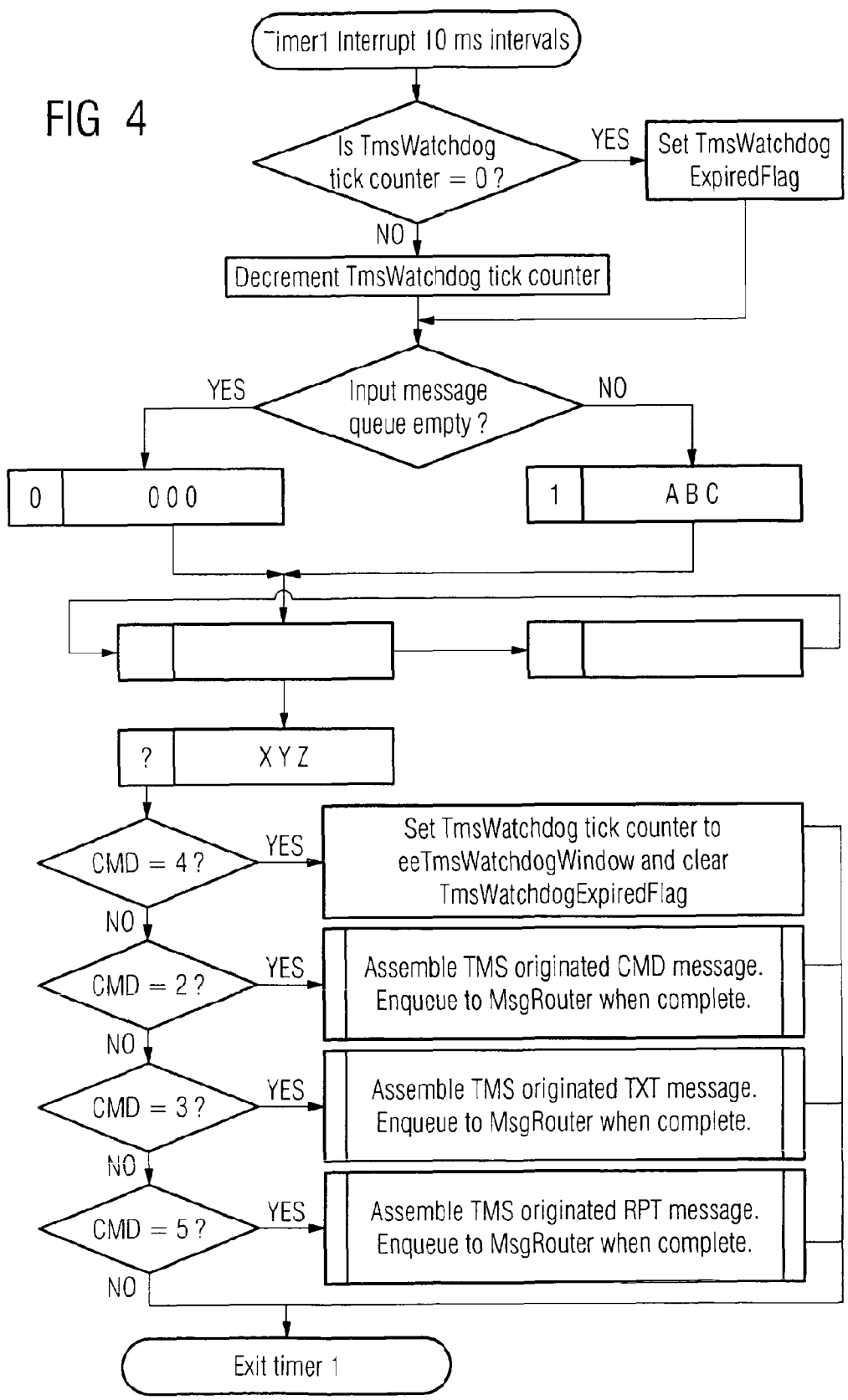
FIG. 4 shows a flow diagram of the microcontroller timer interrupt routine.

At the microcontroller 10, a time tick counter is reset every time a watchdog message 77 is received from the digital signal processor 3. This procedure and the timer routine are shown in the flow diagram of FIG. 4. If no watchdog message 77 is received for a predefined period of time, e.g. 15 seconds, a substitute message is created and sent to the message routing module as if a negative watchdog message 77 was received. When the "STWEF" flag (=Set TMSWatchdogExpiredFlag) is set with the time tick counter=0, the "STWEF" flag is reset as a result in a further step "CMD=4". This watchdog check is run each 10 ms always.

Figure 5:
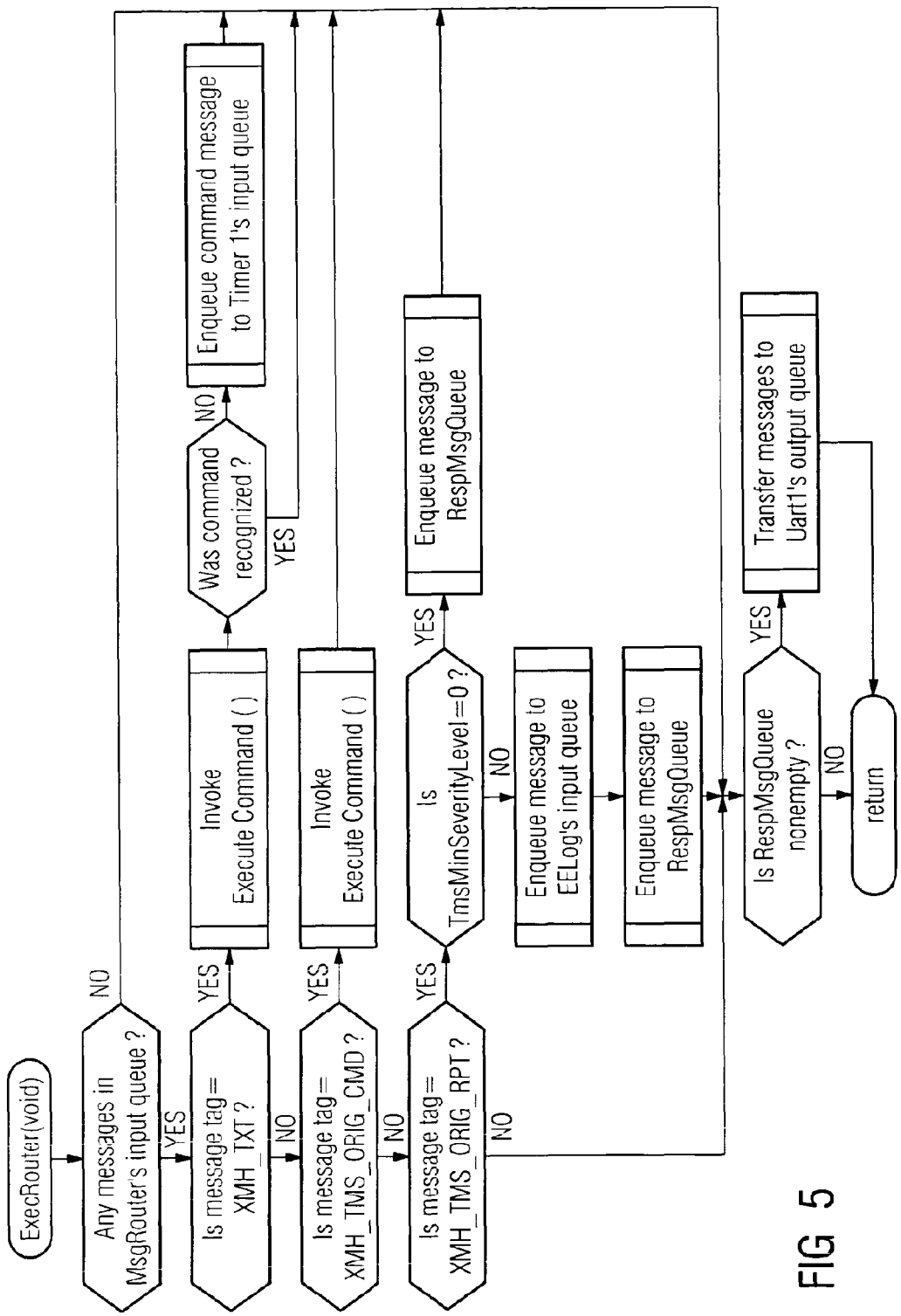
FIG. 5 shows a flow diagram of the microcontroller message router routine.

The message handling of the microcontroller 10 message routing module is depicted in FIG. 5. This module has two queues of messages, one queue for commands and one queue for text that is to be sent to the external terminal 75 of the microcontroller 10. Whatever is written on the terminal 75 keyboard is assembled into internal messages. Only a simple backspace editing capability is included in the universal asynchronous receiver transmitter module 74 input interrupt routine. Completed messages are appended to the input queue of the message router module 71. These messages are tagged as "XMH TXT".

When a command message is taken from the command queue, it calls the command processing module 72 with the message as a parameter. If the command processing module 72 finds a match, the corresponding code is executed and the command message is discarded. If there is no match, the message is appended to the timer input queue to be transferred to the command interpreter of the digital signal processor 3 via the serial peripheral interface 9.

Messages to the command queue of the message router module 71 may also come from the digital signal processor 3. The tags are different and this is used for the invoked command functions to route the response messages back to the digital signal processor 3. In this way, the digital signal processor 3 code may send requests for named parameter values to the microcontroller 10, and the microcontroller 10 looks up the corresponding values in its electrically erasable programmable read-only memory based storage.

If the message router module 71 receives an internal message indicating a malfunction of the digital signal processor 3, the microcontroller 10 reprograms the digital signal processor 3 with the most fail-safe instruction set from the first memory page of the flash memory 12 and restarts the electronic device 1, i.e., the modem. Thereby, the electronic device 1 is reset to an operational state, though at a lower performance than potentially possible. The malfunction can be transmitted to a surveillance instance as soon as possible, for example, via power line communication. The surveillance instance may reprogram the digital signal processor 3 remotely with a different instruction set from the flash memory 12. It may even transmit an update instruction set, i.e., software version, to the flash memory 12 via power line communication, and reprogram the digital signal processor 3 with this update instruction set.

In an alternative embodiment (not shown) the microcontroller 10 detects the type of malfunction and determines the appropriate software version that presumably circumvents this malfunction when the message router module 71 receives an internal message indicating a malfunction of a programmable component, i.e., the digital signal processor 3 or the field programmable gate array 2. It then reprograms the digital signal processor 3 using this software version from the flash memory 12. The type of malfunction and the software version used for reprogramming are logged into the electrically erasable programmable read-only memory. Subsequently, the digital signal processor 3 is restarted, causing the electronic device 1 to enter power-up operational mode. If the same type of malfunction is detected again within a short time of, for example, 2 hours the microcontroller 10 will notice this from the electrically erasable programmable read-only memory log and use a more fail-safe software version for the next reprogramming.

As a consequence, the electronic device 1 is able to restore itself to an operational state after malfunctions of a programmable component.

What is claimed is:

1. A modem system for subsea power line communication comprising:
   a power line modem for subsea power line communication, the modem comprising:
      a programmable component of said power line modem, and
      an independent microcontroller being a component of and housed within said power line modem, and dedicated for monitoring said programmable component of the modem,
   wherein said microcontroller of the modem is programmed to:
      monitor said programmable component of the power line modem during regular ongoing operation of the modem,
      identify a malfunction of said component during regular ongoing operation of the modem,
      automatically and autonomously reprogram said component of the modem in response to identifying the malfunction of said component, and
      automatically and autonomously restart said component of the modem or said modem after reprogramming said component,
      such that the microcontroller of the modem automatically and internally reprograms the component of the modem after a malfunction of the component has been identified.

2. The modem system according to claim 1, wherein said modem comprises at least one other programmable component monitored by the microcontroller.

3. The modem system according to claim 1, wherein said component is a digital signal processor operable to execute multiple software-subsystems, said digital signal processor being operable to sum up checksum values output by several of its software-subsystems to a total checksum.

4. The modem system according to claim 3, wherein said digital signal processor is operable to compare said total checksum to a predefined reference value.

5. The modem system according to claim 4, wherein said digital signal processor is operable to send a watchdog message to said microcontroller only if said total checksum and said reference value match.

6. The modem system according to claim 5, wherein said microcontroller is operable to identify said malfunction if it receives no watchdog messages for a predefined period of time.

7. The modem system according to one claim 1, wherein the microcontroller is operable to detect a type of said malfunction and, depending on this type, to select an instruction set for said reprogramming from multiple instruction sets stored in said electronic device.

8. The modem system according to claim 7, wherein said multiple instruction sets differ in their level of fail-safety.

9. The modem system according to claim 7, wherein said instruction sets are stored in an independent flash memory.

10. The modem system according to claim 1, comprising an external port for a permanent data connection.

11. A method for operating a modem for subsea power line communication comprising a programmable component of the modem and an independent microcontroller being a component of and housed within the modem and dedicated for monitoring said component of the modem, the method comprising the step of:
   the microcontroller being a component of and housed within the modem monitoring the programmable component of the modem during regular ongoing operation of the modem,
   the microcontroller of the modem identifying a malfunction of said component of the modem;
   the microcontroller automatically and autonomously reprogramming said component of the modem in response to identifying the malfunction of said component, and
   the microcontroller automatically and autonomously restarting said component of the modem or said modem after reprogramming said component,
   such that the microcontroller of the modem automatically and internally reprograms the component of the modem after a malfunction of the component has been identified.

12. The method according to claim 11, wherein said modem comprises at least one other programmable component monitored by the microcontroller.

13. The method according to claim 11, wherein said component is a digital signal processor executing multiple software-subsystems, and the method comprises the step of summing up checksum values output by software-subsystems of the digital signal processor to a total checksum.

14. The method according to claim 13, comprising the step of comparing said total checksum by said digital signal processor to a predefined reference value.

15. The method according to claim 14, comprising the step of sending a watchdog message by said digital signal processor to said microcontroller only if said total checksum and said reference value match.

16. The method according to claim 15, comprising the step of identifying said malfunction by said microcontroller if it receives no watchdog messages for a predefined period of time.

17. The method according to claim 11, comprising the step of detecting by the microcontroller a type of said malfunction and, depending on this type, selecting an instruction set for said reprogramming from multiple instruction sets stored in said electronic device.

18. The method according to claim 17, wherein said multiple instruction sets differ in their level of fail-safety.

19. The method according to claim 17, wherein said instruction sets are stored in an independent flash memory.

20. The method according to claim 11, comprising an external port for a permanent data connection.

21. A modem system for subsea power line communication comprising:
  a power line modem for subsea power line communication, the modem comprising:
    a programmable component of said power line modem programmed with a first instruction set for providing operation of the programmable component,
    an independent microcontroller of said power line modem dedicated for monitoring said programmable component of the modem, and
    memory storing at least a second instruction set for providing operation of the programmable component, the second instruction set being different than the first instruction set,
  wherein said microcontroller of the modem is programmed to:
    monitor said programmable component of the power line modem during regular ongoing operation of the modem,
    identify a malfunction of said component during regular ongoing operation of the modem,
    in response to identifying the malfunction of said component, automatically and autonomously reprogram said component of the modem to access the second instruction set from the memory and program the component with the second instruction set instead of the first instruction set, and
    automatically and autonomously restart said component of the modem or said modem after reprogramming said component,
    such that the microcontroller of the modem automatically and internally reprograms the component of the modem after a malfunction of the component has been identified.

22. The modem system according to claim 21, wherein the first and second instruction sets for providing operation of the programmable component comprise different software versions.

23. The modem system according to claim 21, wherein the second instruction set for providing operation of the programmable component is a more fail-safe version of the first instruction set for providing operation of the programmable component.

* * * * *